(12) United States Patent
Lin et al.

(10) Patent No.: US 7,621,387 B2
(45) Date of Patent: Nov. 24, 2009

(54) PARKING BRAKE AND SHIFT MECHANISM FOR VEHICLES

(75) Inventors: Yeu-Jou Lin, Hsinchu (SG); Li-Yu Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 408 days.

(21) Appl. No.: 11/566,666

(22) Filed: Dec. 4, 2006

(65) Prior Publication Data

US 2008/0011576 A1    Jan. 17, 2008

(30) Foreign Application Priority Data

Jul. 12, 2006    (TW) .............................. 95125459 A

(51) Int. Cl.
*B60W 10/10* (2006.01)
*B60W 10/18* (2006.01)
(52) U.S. Cl. .................................. 192/219.4; 74/411.5

(58) Field of Classification Search .............. 192/219.4; 74/411.5

See application file for complete search history.

(56) References Cited

U.S. PATENT DOCUMENTS

| 5,651,439 A | * | 7/1997 | Bailly ...................... 192/53.34 |
| 6,370,976 B1 | * | 4/2002 | Doppling et al. ........... 74/337.5 |
| 2002/0079190 A1 | * | 6/2002 | Burger ..................... 192/219.4 |
| 2006/0124373 A1 | * | 6/2006 | Abraham .................... 180/230 |

\* cited by examiner

*Primary Examiner*—Rodney H Bonck
(74) *Attorney, Agent, or Firm*—Quintero Law Office

(57) ABSTRACT

A parking brake and shift mechanism for vehicles comprises a transmission shaft, a parking shift gear wheel, a stopper, and a dog clutch. The parking shift gear wheel is provided with at least one tooth to move in conjunction with the axis of the transmission shaft. The stopper is provided with at least one groove which contains the tooth. The dog clutch is fixed on the transmission shaft and provided with at least one concavity for accommodating the tooth.

11 Claims, 8 Drawing Sheets

PARKING BRAKE AND SHIFT MECHANISM FOR VEHICLES

BACKGROUND OF THE INVENTION

1. Field of the Invention

The invention relates to a parking brake and shift mechanism, and more particularly to a parking brake and shift mechanism for vehicles.

2. Description of the Related Art

The two design parking break and shift mechanism designs for four wheeled vehicles comprise transmission-mounted and frame-mounted. Both serve as a parking brake and shift mechanism by preventing movement of the transmission shaft. Regardless of design all parking brake mechanisms are placed outside of the engine. The design and fabrication of outside the engine parking brake and shift mechanisms is not only more complex but occupies a larger volume.

Motorcycle engines are popularly employed in a great variety of four wheeled vehicles, such as all terrain vehicles (ATVs) due to their low weight and small size. Various ATV parking brake and shift mechanisms employ a latching mechanism (such as a rocker arm or cam) to latch the parking shift gear wheel to the transmission shaft. This type of mechanism, however, is rather complex. Moreover, if the existing design of the engine and related equipment is modified by the addition of a parking brake and shift mechanism, the level of complexity persists, resulting in difficulty in layout, excessive design modification, and increased development costs.

BRIEF SUMMARY OF THE INVENTION

A simple parking brake and shift mechanism is disposed inside a vehicle engine for braking and changing gears. The main feature of the invention is placement of the parking brake mechanism inside the engine, adding a shift gear wheel to the crankcase based on the existing engine, and locking the transmission shaft via the crank case to prevent rotation of the transmission shaft due to the engagement between the dog clutch on the transmission shaft and the shift gear wheel while parking. Thus, the engine provides a parking brake function.

The invention is advantageous in that it decreases the amount of occupied space outside the engine and the complexity of fabrication due to placement of the parking brake inside the engine. Fewer components and lower cost result due to the use of existing gear mechanisms requiring only slight modification. Thus, the parking brake mechanism of the invention can be easily implemented in existing motorcycle engines, expanding the range of applications for existing motorcycle engines in four wheeled vehicles such as ATVs and greatly increasing the competitiveness of existing engines.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
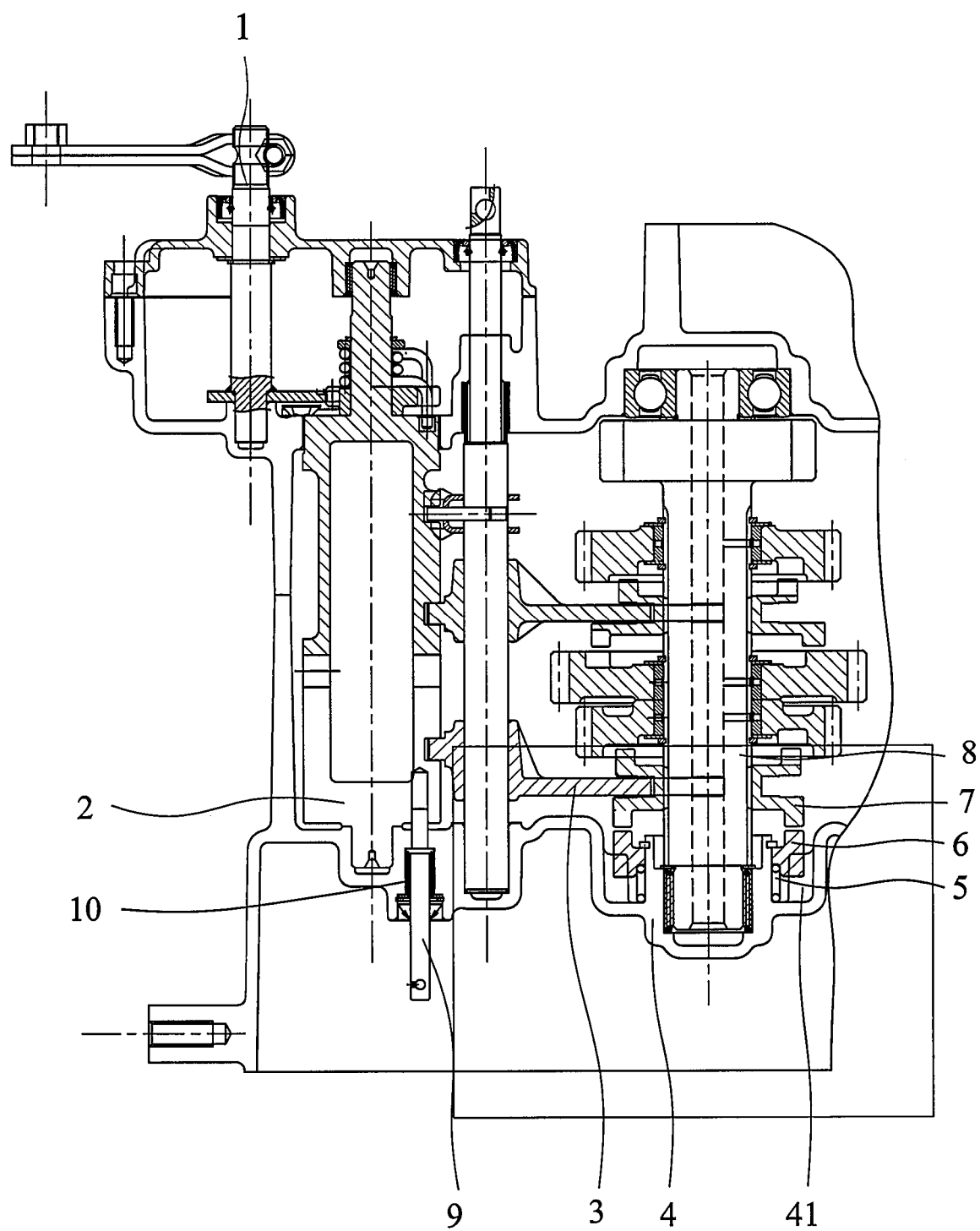
FIG. 1 is a sectional view of the parking brake and shift mechanism of the invention shifted into neutral gear.

FIG. 1 is a sectional view of the parking brake and shift mechanism of the invention in neutral, wherein the parking brake and shift mechanism for vehicles, disposed in crankcase 4, mainly comprises a gearshift lever 1, a gearshift drum 2, a gearshift fork 3, a transmission shaft 8, a dog clutch 7, a parking shift gear wheel 6, a stopper 41, a return spring 5, a gearshift protection pin 9, and a return spring of gearshift protection pin 10.

Figure 3:
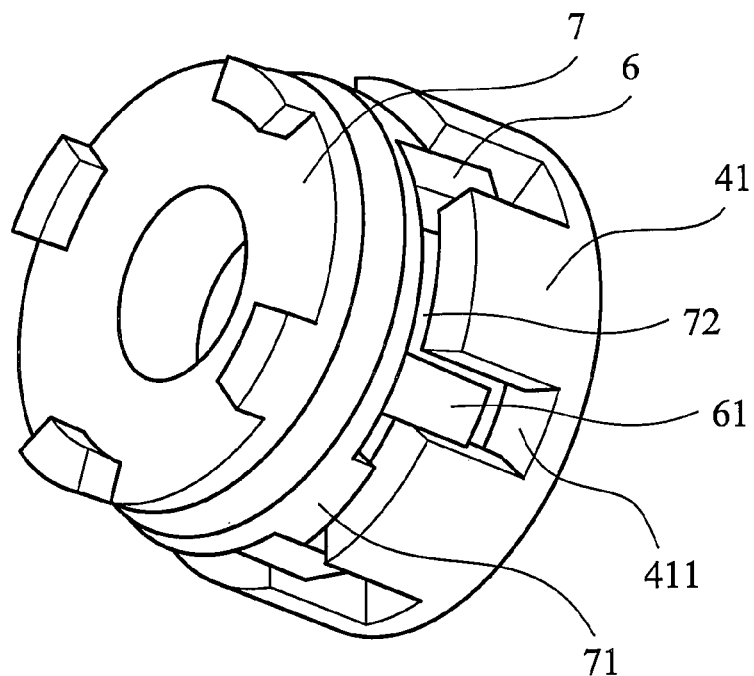
FIG. 3 is a perspective diagram showing the relationship between the crankcase, the shift gear wheel and the dog clutch while the parking brake and shift mechanism of the invention is shifted into parking gear.

The relationships between each component are described in the following:

Transmission Shaft—As shown in FIG. 3, the dog clutch 7 and the parking shift gear wheel 6 are sequentially disposed on the transmission shaft 8. The dog clutch 7 is fixed to the transmission shaft 8 and provided with one or a plurality of concavities 72 and convexities 71. The parking shift gear wheel 6 is axially moveable along the transmission shaft 8 and provided with one or a plurality of teeth 61 mesh with the concavities 72 of the dog clutch 7.

Stopper—The stopper 41 is fixed to the crankcase 4 or integrated with the crankcase 4. The stopper 41 is further provided with one or a plurality of grooves 411 to contain the teeth 61 for constraining rotation of the parking shift gear wheel 6, but allowing the parking shift gear wheel 6 to move axially along the transmission shaft 8.

Return Spring—The return spring 5 is mounted between the parking shift gear wheel 6 and crankcase 4. If the parking shift gear wheel 6 is pushed toward the stopper 41 by an external force, the return spring 5 will return the parking shift gear wheel 6 back to the original position when the external force is removed. The return spring 5 can be replaced with an elastomer such as a leaf spring, an elastic rubber, a gasbag, or similar.

Figure 2:
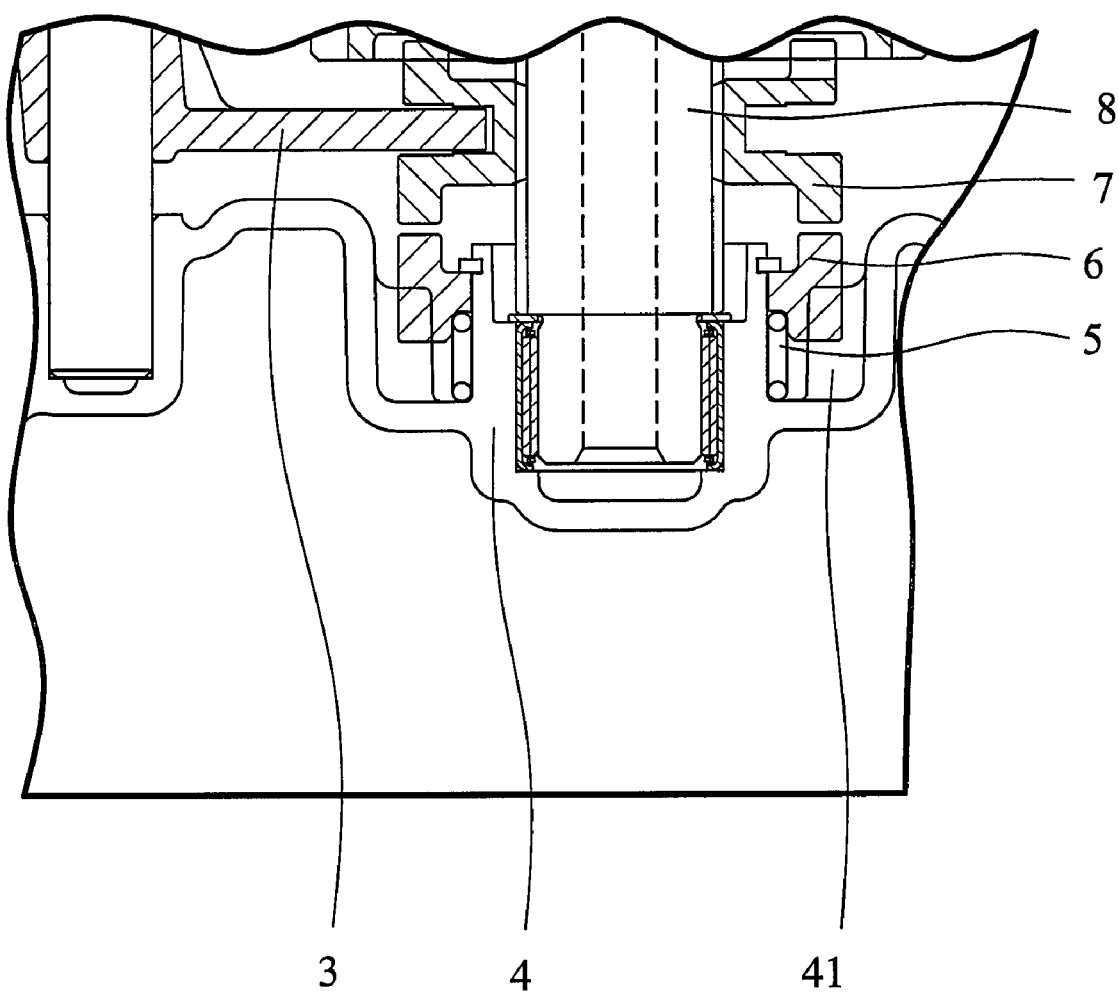
FIG. 2 is a sectional view of the parking brake and shift mechanism of the invention shifted into parking gear.

When the parking brake and shift mechanism is shifted as shown in FIG. 2, the gearshift lever 1 is pulled to rotate the gearshift drum 2 as shown in FIG. 1, and the gearshift fork 3 is moved down, and the convexity 71 of the dog clutch 7 is driven downward to the interval between teeth 61 of the parking shift gear wheel. At this moment, the three convexities 71 of the dog clutch 7 mesh with the six teeth 61 of the parking shift gear wheel 6 separately and symmetrically as shown in FIG. 3. Thus, transmission shaft 8, dog clutch 7 and the parking shift gear wheel 6 merge into one unit and prevent rotation of the transmission shaft 8 due to the engagement of groove 411 of stopper 41 and tooth 61 of the parking shift gear wheel 6, thus parking occurs.

Figure 4:
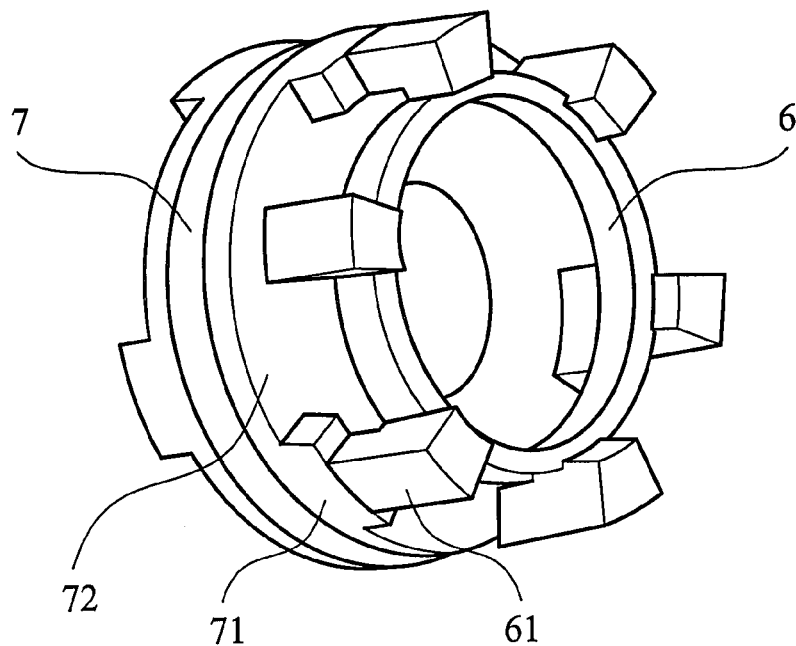
FIG. 4 is a perspective diagram of the parking brake and shift mechanism of the invention while the dog clutch abutting the parking shift gear wheel.
Figure 5:
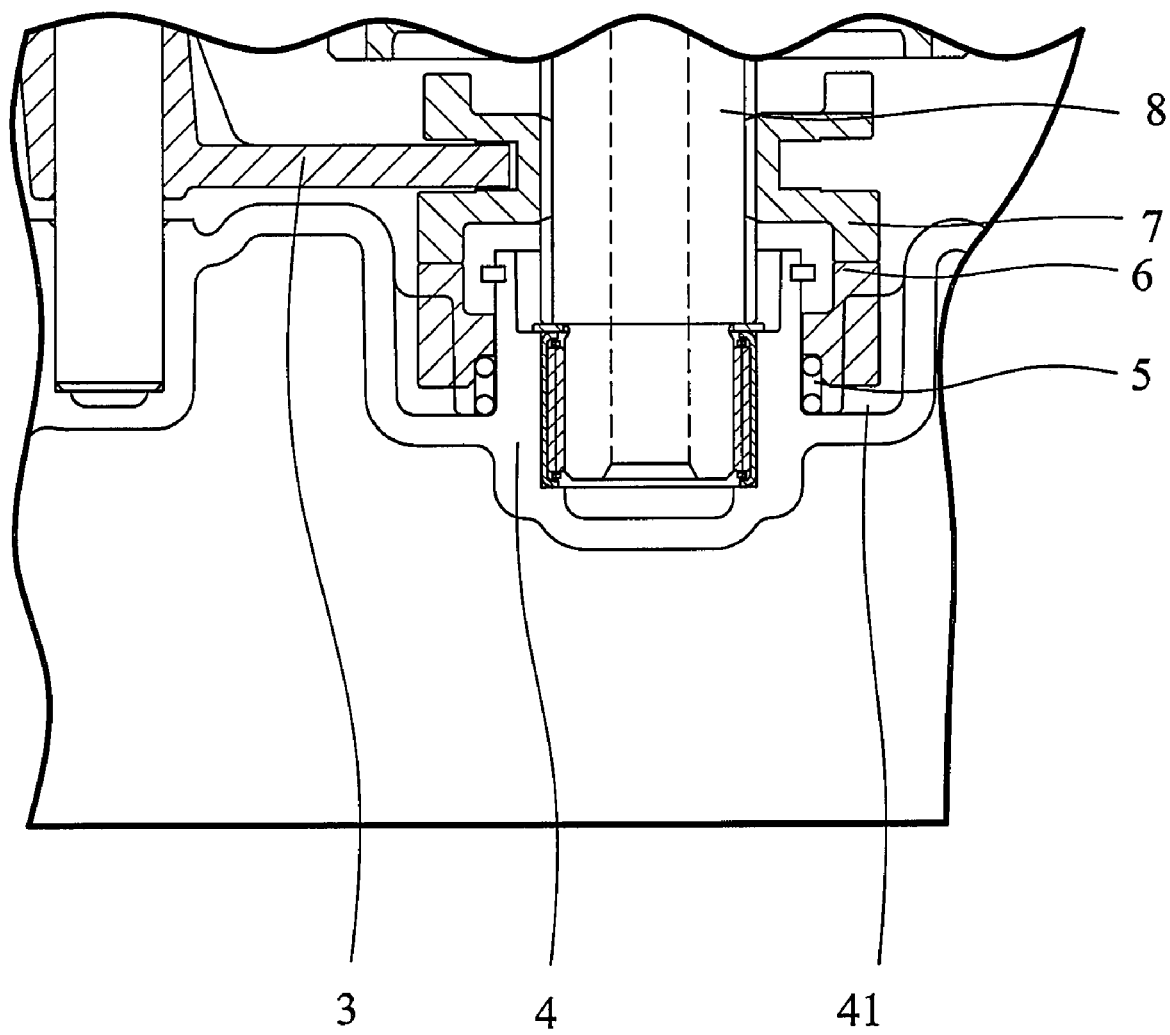
FIG. 5 is a sectional view of the parking brake and shift mechanism of the invention not shifted into parking gear.
Figure 6:
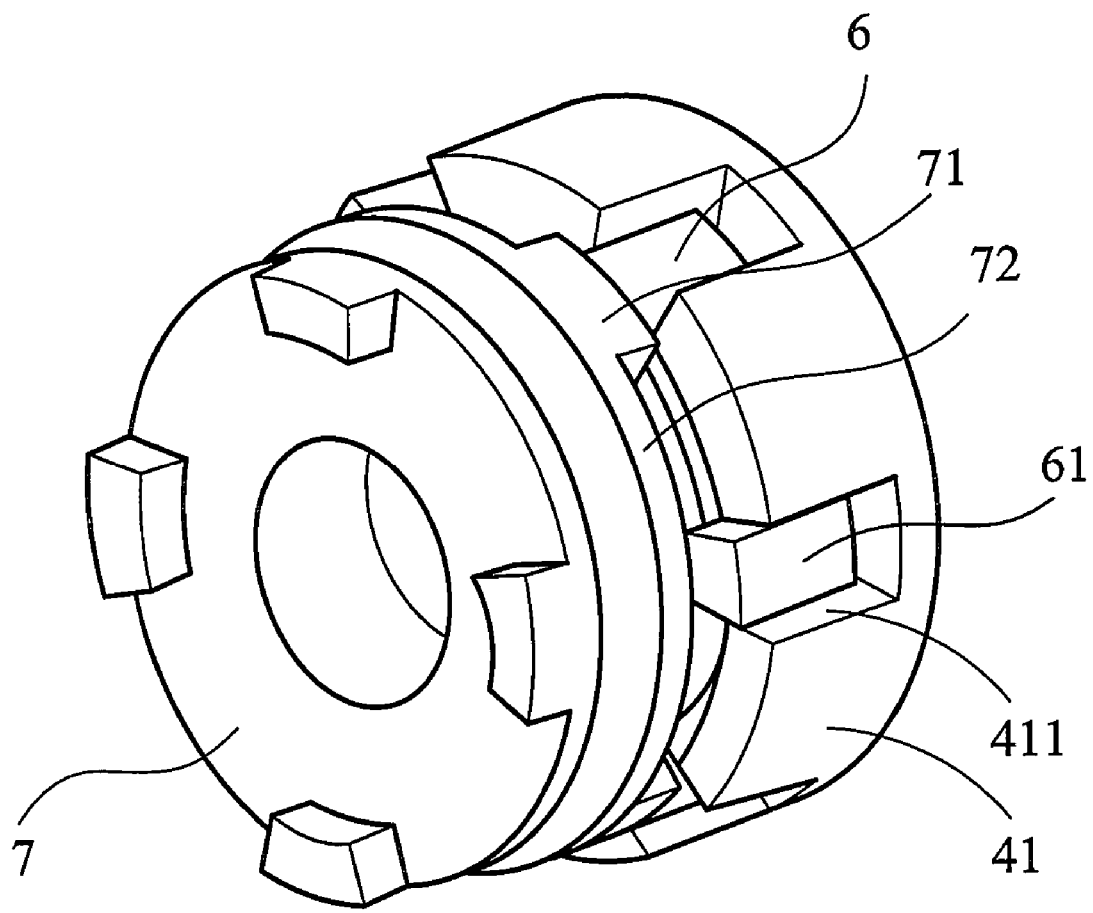
FIG. 6 is a perspective diagram showing the relationship between the crankcase, the parking shift gear wheel and the dog clutch while the parking brake and shift mechanism of the invention is not shifted into parking gear.

When the parking gear is shifted as shown in FIG. 4, the convexity 71 of the dog clutch 7 may potentially abut the tooth 61 of the parking shift gear wheel 6. Thus, the parking gear is not shifted because the dog clutch 7 is not able to engage the parking shift gear wheel 6. At this moment the dog clutch 7 pushes the parking shift gear wheel 6 toward the return spring 5. Thus, the return spring 5 is compressed as shown in FIG. 5 and FIG. 6.

If the vehicle is moved slightly by external force or by gravity, the transmission shaft 8 will slightly rotate the wheel, and the convexity 71 of the dog clutch 7 will mesh with the teeth 61 of the parking shift gear wheel 6 as shown in FIG. 3. At this moment, in a normal parking shift situation as shown in FIG. 2, the parking gear is shifted as shown in FIG. 2 because the parking shift gear wheel 6 is returned to its original position by the return spring 5.

When the parking gear is shifted out of the parking gear, the gearshift lever 1 is pulled to rotate the gearshift drum 2 and drives the gearshift fork 3 upward, thus, the teeth 61 of the parking shift gear wheel 6 leave the convexities 71 of the dog clutch 7 and the transmission shaft 8 can again freely rotate to shift out of parking gear.

Figure 7:
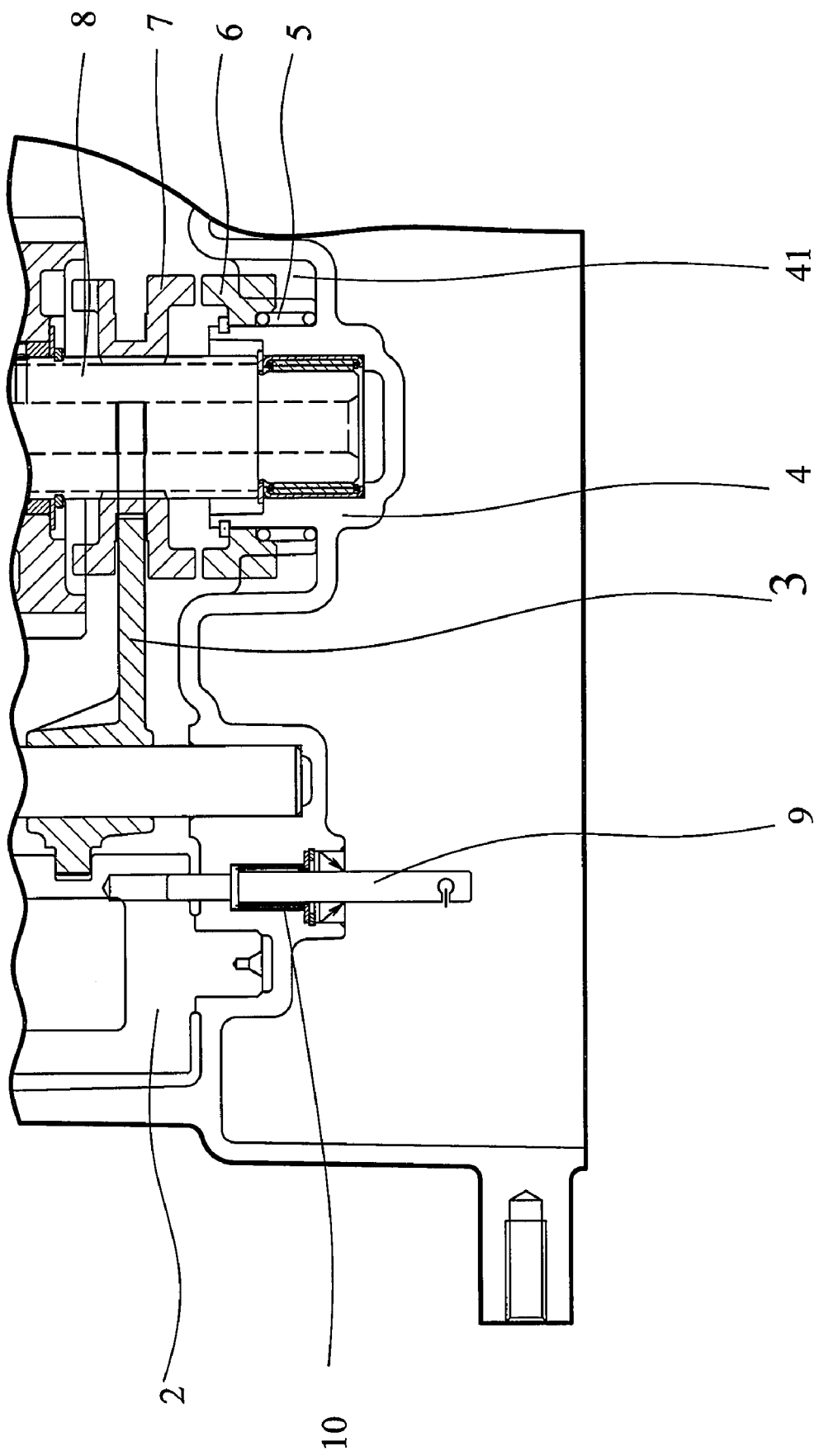
FIG. 7 is a sectional view of the gearshift protecting mechanism protecting the gearshift at the axial position.

In order prevent user error when shifting, a gearshift protection pin 9 is mounted on the crankcase 4 and inserted into the gearshift drum 2 in an axial direction for constraining the gear shift drum 2 as shown in FIG. 7. The return spring of gearshift protection pin 10 is further mounted on the crankcase 4 for keeping the gearshift protection pin 9 in the original position.

Figure 8:
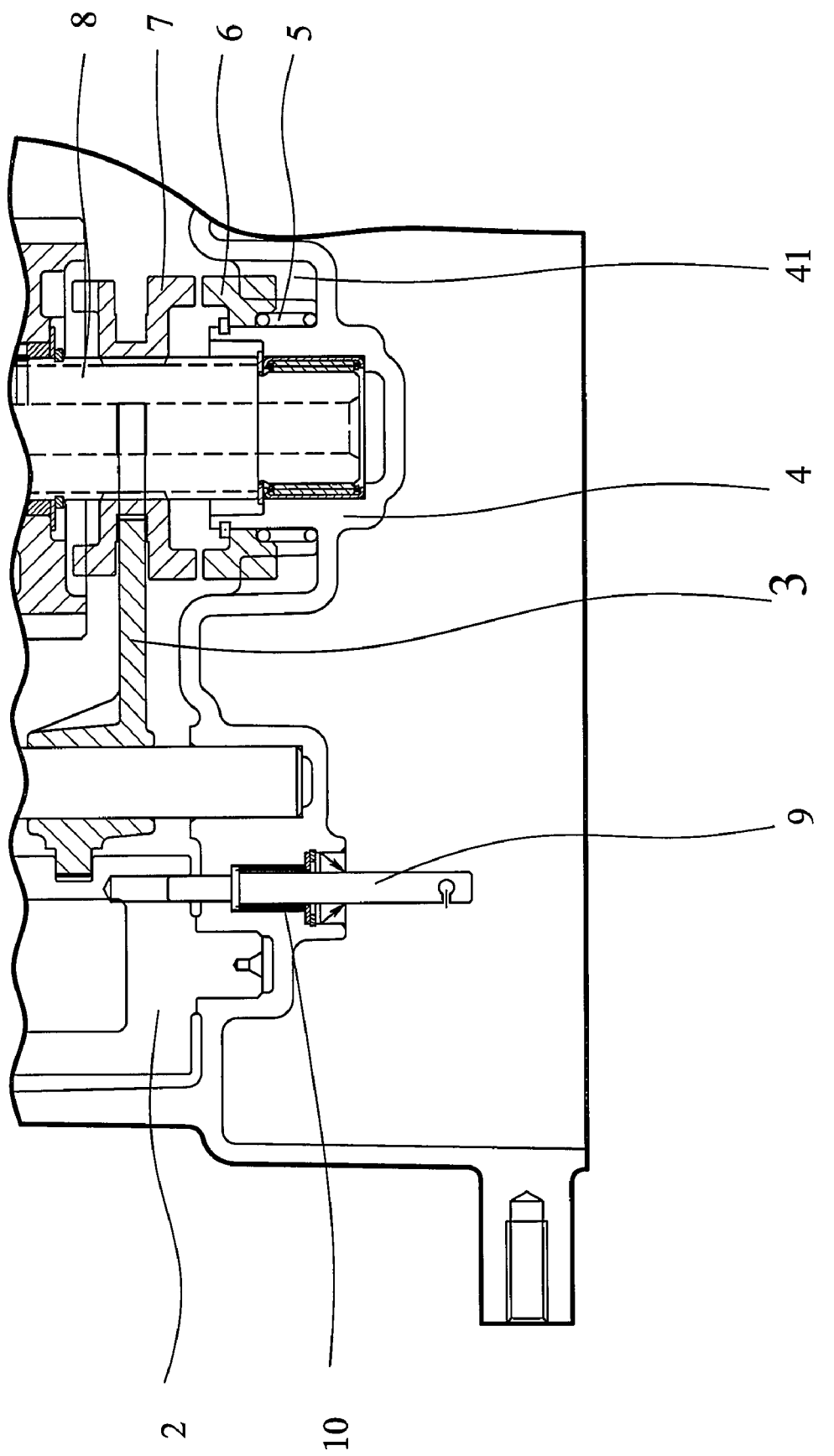
FIG. 8 is a sectional view of the gearshift protecting mechanism at the axial position as the gearshift is shifted.
Figure 9:
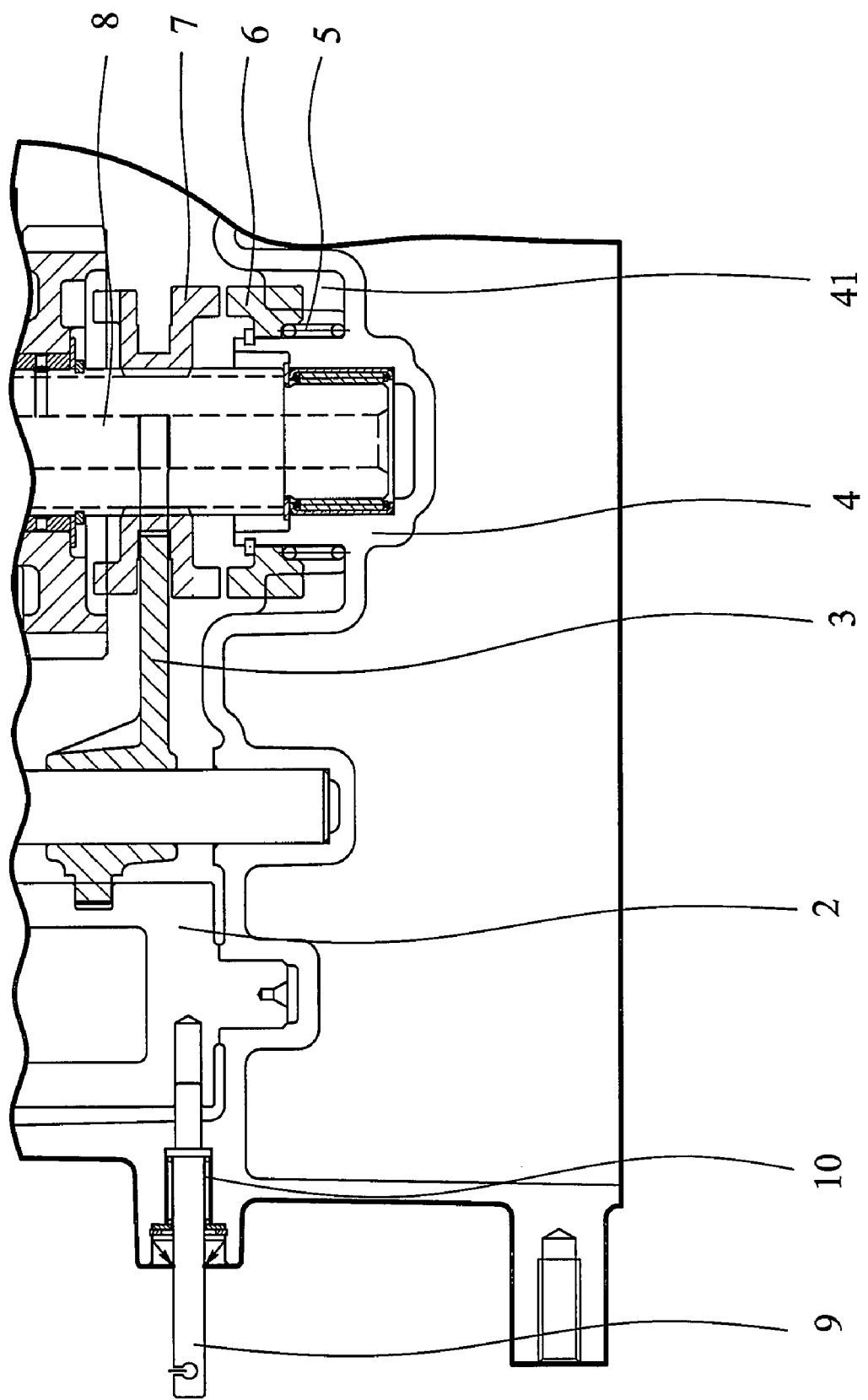
FIG. 9 is a sectional view of the gearshift protecting mechanism at the radial position as the gearshift is shifted.

When the gearshift lever 1 is pulled for shifting into parking gear or out of parking gear as shown in FIG. 8, the gearshift protection pin 9 must be pulled out to enable the gearshift drum 2 to rotate for shifting. After shifting, the gearshift protection pin 9 is pushed back to the original position by the return spring of gearshift protection pin 10 and returns to the protecting position. The return spring of gearshift protection pin 10 can be replaced by the elastomer such as the leaf spring, the elastic rubber, and the gasbag. The gearshift protection pin 9 can also be mounted on the crankcase 4 and inserted into the gearshift drum 2 in a radial direction of the gear shift drum 2 for constraining rotation of the gearshift drum 2 and user error, as shown in FIG. 9, can be prevented.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A parking brake and shift mechanism, comprising:
   a transmission shaft;
   a parking shift gear wheel with teeth axially movable along said transmission shaft;
   a stopper with at least one groove containing one of said teeth;
   an elastomer pushing between said teeth and said stopper;
   a dog clutch provided with at least one convexity for insertion between said teeth;
   a transmission case enclosing said transmission shaft, said parking shift gear wheel, said stopper, and said dog clutch wherein said stopper is fixed to said transmission case;
   a gearshift lever mounted outside said transmission case;
   a gearshift drum mounted inside said transmission case and rotated by movement of said gearshift lever; and
   a gearshift fork mounted inside said transmission case to push said dog clutch axially moving in an axial direction of said transmission shaft when said gearshift drum is rotated.

2. The parking brake and shift mechanism as claimed in claim 1, wherein said convexity abuts at least one of said teeth.

3. The parking brake and shift mechanism as claimed in claim 1, wherein said elastomer is a spring, a leaf spring, or an elastic rubber.

4. The parking brake and shift mechanism as claimed in claim 1, wherein said stopper is integrally formed with said transmission case.

5. The parking brake and shift mechanism as claimed in claim 1, further comprises a protecting pin mounted on said transmission case to be inserted into said gearshift drum.

6. The parking brake and shift mechanism as claimed in claim 5, further comprising a restoring elastomer pushing between said protecting pin and said transmission case.

7. The parking brake and shift mechanism as claimed in claim 6, wherein said restoring elastomer is a spring, a leaf spring, or an elastic rubber.

8. The parking brake and shift mechanism as claimed in claim 5, wherein said protecting pin is inserted into said gearshift drum in a radial direction of said gearshift drum.

9. The parking brake and shift mechanism as claimed in claim 5, wherein said protecting pin is inserted into said gearshift drum in an axial direction of said gearshift drum.

10. The parking brake and shift mechanism as claimed in claim 1, wherein said dog clutch further comprises at least one concavity for containing said teeth.

11. The parking brake and shift mechanism as claimed in claim 1, wherein the dog clutch is provided with a plurality of convexities inserted between said teeth.

* * * * *